United States Patent [19]

Mendenhall

[11] 4,182,631

[45] * Jan. 8, 1980

[54] ASPHALT-AGGREGATE PRODUCTION

[76] Inventor: Robert L. Mendenhall, 1770 Industrial Rd., Las Vegas, Nev. 89102

[*] Notice: The portion of the term of this patent subsequent to Dec. 28, 1993, has been disclaimed.

[21] Appl. No.: 718,063

[22] Filed: Aug. 26, 1976

Related U.S. Application Data

[63] Continuation-in-part of Ser. No. 603,357, Aug. 11, 1975, Pat. No. 3,999,743.

[51] Int. Cl.$^2$ .................. C04B 13/30; C08L 95/00
[52] U.S. Cl. ........................ 106/281 R; 404/72; 404/79
[58] Field of Search .............. 106/275, 280, 281, 282, 106/283, 284; 404/79, 80

[56] References Cited

U.S. PATENT DOCUMENTS

| | | | |
|---|---|---|---|
| 1,836,261 | 12/1931 | Madsen | 259/149 |
| 1,954,997 | 4/1934 | Hirzel | 106/281 R |
| 3,547,411 | 12/1970 | Sowell | 259/148 |
| 3,614,071 | 10/1971 | Brock | 259/147 |
| 3,832,201 | 8/1974 | Shearer | 259/158 X |
| 3,840,215 | 10/1974 | McConnaughay | 259/158 |
| 3,866,888 | 2/1975 | Dydzyk | 259/158 |
| 3,971,666 | 7/1976 | Mendenhall | 106/273 X |
| 3,999,743 | 12/1976 | Mendenhall | 259/158 |

OTHER PUBLICATIONS

The Asphalt Handbook, Jul., 1962 Edition, Manual Series No. 4, 1962 Published by The Asphalt Institute College Park, Maryland Jul., 1962 (pp. 132 & 131 relied on) TE 270A65 1962 C.3.

*Primary Examiner*—Theodore Morris
*Attorney, Agent, or Firm*—Seiler & Quirk

[57] ABSTRACT

In a process for producing asphalt-aggregate compositions in a conventional type dryer-mixer drum in which aggregate is exposed directly to flame and hot gases of combustion while it cascades in the rotating drum, and in which the flame and hot gases of combustion are directed into an input end of the drum, the improvement comprises separating the aggregate into a plurality of different portions or increments each having different particle size ranges, introducing the coarse or larger aggregate particles into the drum and directly exposing them to the flame, its radient heat, hot gases of combustion at the input end, and introducing the finer or smaller aggregate particles downstream from the input end and away from direct exposure to the flame and extremely hot gases in a temperature zone which will avoid overheating the fine particles. The improved apparatus includes means for introducing the coarse particles at the input drum end for direct exposure to the flame or hottest gases and means for introducing the fine or smaller particles in a cooler zone of the apparatus.

10 Claims, 1 Drawing Figure

ASPHALT-AGGREGATE PRODUCTION

This application is a continuation-in-part of applicant's co-pending application Ser. No. 603,357, filed Aug. 11, 1975.

BACKGROUND OF THE INVENTION

Heretofore virgin asphalt-aggregate compositions have been prepared primarily in elongated inclined rotatable cylinders often referred to as dryer drums. In some processes, aggregate is introduced at one end of the apparatus where it is exposed to flame and hot gases of combustion and becomes dried and is gradually drawn to the output and cooler apparatus end where it is mixed with asphalt. In other processes, the drum is used only to dry and heat the aggregate after which it is directed to a pugmill mixer where it is combined with the asphalt to form the asphalt-aggregate composition. Apparatus used in such processes are well known in the art and described, for example, in U.S. Pat. Nos. 3,423,222, 3,614,071, 3,840,215 and 3,866,888. These patents are simply representative of prior art devices used for drying the aggregate and producing the asphalt-aggregate compositions therefrom. Although such apparatus has been considered generally suitable heretofore, there are some disadvantages. Of major concern is the efficient use of energy in drying and heating the aggregate so as to obtain maximum efficiency in the process. The heaters used are normally oil or gas burning devices which direct a flame, often via a funnel or other flame concentrating and directing means, into one end of the drum. All of the aggregate is then continuously introduced into the drum at the drum input end so that it passes through the hot flame and gases of combustion. The aggregate is then gradually dried as the drum rotates, the drum usually having flites or lifters which elevate the particles along the drum side and then allow them to pass down through the hot gases of combustion for further continued and gradual drying and heating. It has been found however, that where all of the aggregate is introduced in one temperature zone of the apparatus, the different sized particles are not uniformly heated. For example, in such a drying process, in individual particles usually spend only about 3–6% of the total drying and mixing time being actually exposed to the hot gas, i.e. only when cascading or falling in the drum. The remaining residence time the particles are settled in the aggregate mass and become heated or cooled depending on the temperature of the surrounding aggregate. Moreover, large particles will be heated only a few degrees as they are exposed to the hot gases whereas relatively small particles may become rapidly heated, even up to the gas temperature, for example, 1200° F. or so, during the short exposure time. Yet, these extremely hot small particles may tend to settle in the bottom of the aggregate mass rather than being thoroughly or uniformly mixed throughout the total aggregate mass. Because of this problem, efficient and uniform heating is not achieved since the small, very hot particles settling to the bottom of the mass may transfer much of their heat to the sides of the drum rather than to the other larger aggregate particles. Further, such very hot small aggregate particles may also burn liquid asphalt when mixed in the drum if the hot particles have not cooled sufficiently prior to asphalt introduction. Such asphalt burning not only causes degradation of the product due to asphalt coking and oxidation, but noxious fumes and gases are are also given off which are disadvantageous from an environmental standpoint. The presence of small particles in the cascading mass within the drum also creates a "veil" which may significantly effect the air draft through the drum required to remove moisture during aggregate drying. Thus, in a process where the fine particles are mixed and dried together with larger particles for a substantial distance in the drum, drying efficiency will be reduced.

SUMMARY OF THE INVENTION

It is to the elimination of aforementioned problems that the present apparatus and process are intended. Basically, the process comprises first separating aggregate particles to be dried, and/or heated and mixed into two or more particle size ranges. The coarse particles, that is the larger particles are then introduced into the hottest zone of the apparatus, usually at the input end so that they are exposed directly and immediately to the hot flame, radiant heat, and gases of combustion from the burner supplying heat to the drum, while the smaller particles are introduced downstream in one or more cooler zones away from the hottest input end. By introducing the aggregate particles in different size ranges in different temperature zones, with the larger particles being introduced into the hottest drum zone and smaller particles into one or more cooler zones, the flame, radiant heat, and hottest gases will be used to heat the largest particles but without overheating and the smaller particles, which are more easily heated by exposure to cooler gases for a lesser period of time, do not become overheated. Moreover, the smaller particles are dried before being mixed and coated with asphalt, but because of their shorter residence time, the less is their effect on the gaseous draft. In this manner, the efficiency of the heating process is maximized without the danger of asphalt degradation since the aggregate will become uniformly heated even though particle sizes range from fine to coarse. These as well as other disadvantages will be evident from the following detailed description.

DETAILED DESCRIPTION OF THE INVENTION

Figure 1:
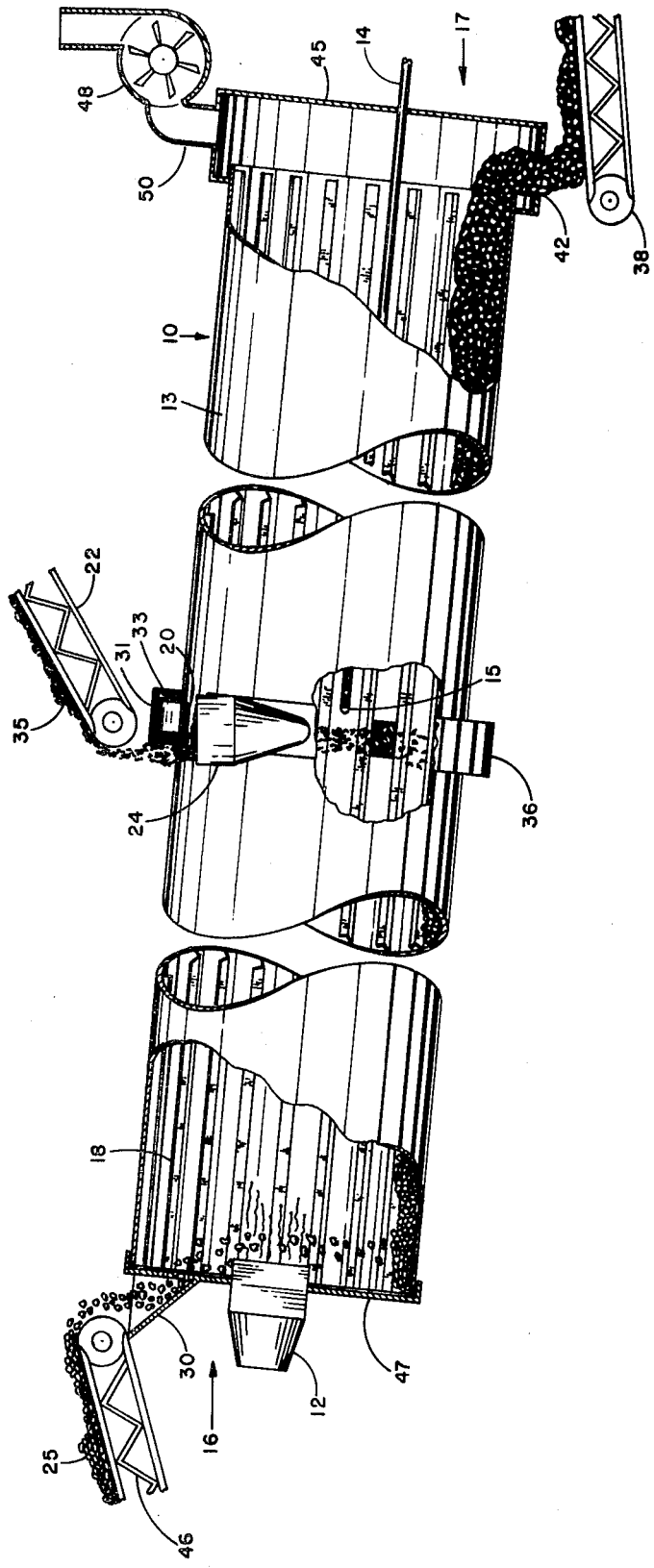
FIG. 1 illustrates the apparatus of the invention, partially in section and partially cut away, showing the improved features of the modified apparatus.

Observing now the drawing, there is illustrated a rotatable dryer-type drum 10 having an outer cylindrical cover or surface 13, a stationary input end wall 47, and a stationary output end cover 45, enclosing the hollow interior drum chamber. Secured on the interior drum surface are a plurality of elongated lifters or flights 18 extending substantially the length of the drum interior. The purpose for the lifters is to assist in mixing the aggregate by lifting it as the drum rotates. The aggregate then cascades from the rising lifters and falls gravitationally to the bottom of the rotating drum during the mixing and heating operation. The drum is preferably inclined as shown so that aggregate introduced at input end 16 will be drawn gradually gravitationally toward output drum end 17. Thus, the input end is elevated relative to the output end. The degree of tilt may be varied to change the rate at which the material flows through the drum. The apparatus includes means for rotating the drum, not shown, for example, a sprocket extending around the drum surface 13 to which is secured a chain also meshing with gears and a motor or other drive means. The drum may be supported on rollers and a suitable frame. Such means for rotating and supporting the drum are not a part of the invention and will be understood by those skilled in the art.

Aggregate introduced into the drum during the processing is heated by flame including both luminous and nonluminous portions, radiant energy and hot gases of combustion from burner 12, of any suitable conventional oil or gas burning type, which will produce flame and hot gases directed into the drum interior through an orifice funnel or opening suitably located in the input end wall 47. The hot gases are drawn into the drum interior to provide the heat for gradually drying and/or heating the mixing aggregate.

Toward the forward drum end, asphalt is introduced, usually hot, to the heated aggregate for producing asphalt-aggregate composition suitable for paving road surfaces and the like. The asphalt and aggregate are then mixed by the rotating drum. The forward and output drum end is covered with stationary output end cover 45, having a port 42 at the bottom thereof through which heated and mixed composition is recovered. The composition simply falls through the port onto a conveyor 38. Other equivalent product recovery means may be used and that shown is by way of example only. Both the input end wall and output end cover are separated at least slightly from their respective drum end surfaces to avoid interference with drum rotation. On or near the top of the output end cover is a gas vent stack 50 which cooperates with an exhaust fan 48 to draw the hot gases from burner 12 through the drum and into the stack for venting and discharge into the atmosphere. Alternatively, the gases and entrained dust may be directed to a dust collector or knock out box with cooperating ducts.

The significant improvement of the process and apparatus of the present invention is the manner in which aggregate particles are introduced into the heating and mixing drum and the improved and advantageous result therefrom. It has been found that by introducing the smaller aggregate particles in a cooler zone in the apparatus as compared to the zone in which the larger particles are introduced heating efficiency is improved, asphalt degradation is substantially decreased, if not eliminated, improved product is achieved, and air pollution problems due to smoke, unburned hydrocarbons, noxious gases, and fumes being vented into the atmosphere are obviated. Again, the reason for such improvements is that the smaller particles are not overheated, thereby reducing heat losses due to non-uniform heating and settling of hot, dense small particles as well as burning asphalt contacting the overheated small particles.

In the apparatus as shown, hot gases of combustion produced by burner 12 are directed into the drum interior. Although it is desirable to maximize heat utilization in heating the composition, it is also important to avoid overheating the particles as previously explained. Normally, in most hydrocarbon (oil or gas) fueled burners, a flame or luminescent or luminous portion of the rapidly oxidizing hydrocarbons is present for some distance forwardly of the burner nozzle. This visible portion or flame is an abundant source of infrared energy and is extremely hot, for example, 500° to 1000° F. hotter than the hot gases of combustion which are just ahead of the flame. It has been found that the larger aggregate particles are greater "sinks" for absorbing heat whereas smaller particles may be quickly overheated if exposed to the same temperatures for a like period of time. For example a small particle may achieve a temperature of say 1200° F. in the short time (a second or so) it takes to fall through the hot gas, whereas a large aggregate particle may heat up only a few degrees when exposed to the same conditions for the same time. Moreover, since the smaller particles usually settle through the aggregate mixture, they need not become overheated which would otherwise reduce the process efficiency. Accordingly, it is advantageous to introduce the coarse particles into the drum at the input end as shown so that the particles will be exposed to and pass through the hottest gases entering the drum at the input end. The finer particles are introduced some distance or distances away from the input end, in one or more zones having a temperature less than that which would cause particle overheating.

As shown in FIG. 1, coarse particles 25 are directed into drum 10 at the input end 16 just inside end wall 47, being directly exposed to hot gases from burner 12 in a first and hottest drum zone. In this zone of the drum the environmental temperatures may be, for example, between about 1,000° and about 3,000° F., and higher, depending on the size and output of the burner as well as the dispersion of flame and hot gases. Again, if the coarse particles are of suficient size, they may pass through the very hot environment without being overheated. In this first hot zone, the coarse particles are alternately lifted along the drum interior surface and dropped through the hot gas while they gradually are drawn forwardly toward the output drum end. During this time, the coarse particles are dried and become gradually heated.

As also shown, small or finer size particles 35 are introduced at some distance forwardly, downstream or toward the output end of the apparatus from the input end, in a second and cooler zone. The specific temperature of the cooler zone will depend on the distance from the hot input end at which the finer particles are introduced as well as the output or capacity of the burner used in the apparatus. Although the second zone is cooler, the finer aggregate particles will become heated sufficiently by exposure to the cooler gas passing through that zone. These more easily heated smaller particles alternately cascade and mix with the by now warmed coarse particles. Moreover, because the second zone is cooler, these smaller particles will not be overheated which would otherwise cause non-uniform aggregate heating as previously pointed out.

Although two of such zones are shown in the drawing, three or more separate zones may be used for introducing the aggregate particles, each one being cooler than the next adjacent zone nearer the input end. Thus, it will be understood that any number of a plurality of zones or positions at which aggregate particles are introduced may be used, depending on the practical considerations of apparatus design and separation and handling of different particle sizes desired. Thus, two zones may be sufficient, one hot for coarse particles and one cooler for finer particles and is preferred for producing most road or street grade asphalt-aggregate compositions. Yet, for some processes depending on the variety of aggregate used, three or even four or more zones may be desirable. Moreover, if the apparatus is provided with means for introducing composition into more than two zones, only two zones need actually be used. Because the specific distance between zones is dependent on burner capacity, particle sizes, and the like, the distance between input end wall 47 and the second zone fed to chute 24 as shown in FIG. 1 is only for the purpose of illustration and is not limiting. Thus, the distance between zones may be selected to achieve the desired temperatures in the respective zones.

According to the preferred embodiment, where aggregate is separated into two particle size ranges, a convenient size breakdown for most street and road asphalt-aggregate compositions is coarse particles retained by a seive having a mesh of between 4 and 10 and preferably less than 8 (U.S. Series) with fine particles being those passing a No. 8 U.S. series mesh and smaller (larger mesh numbers). Any suitable breakdown for distinguishing coarse and fine particles to be introduced in hot and cooler zones respectively may be used so long as the zone temperatures do not overheat the aggregate particles introduced therein but yet heat them adequately in the time exposed in that zone. For example, if particle sizes are too large in the cooler heating zone, they may not become adequately heated to achieve a final composition temperature desired. Moreover, it may be advantageous to use more than two aggregate introducing zones, for example, three, with coarse particles retained by No. 4 mesh sieve and lower, intermediate passing No. 4 and retained by No. 10 and fine passing greater than No. 10 (U.S. series). In this manner, there would be more control over the aggregate heating since the heat at each zone would be more specific to the particle size ranges exposed to the respective temperatures thereby affording even greater control of aggregate heating temperatures. In the three grade embodiment, coarse particles will normally comprise 40%±15% of the composition by weight, intermediate particles 30%±15% and fine particles 30%±15%. Such a definition may be applied universally for the aggregate, regardless of specific particle size ranges and is also convenient and practical in providing rather even distribution of the grades introduced into the three different drum zones. Similarly, wherey only two grades are used, a useful designation of coarse materials is 60%±20% by weight of the total composition and comprising the largest particles and fine particles being the smallest particles and 40%±20% by weight. It will also be understood that there may be some smaller particles present in the coarse particle portions. Thus, in any such aggregate particle size breakdown, there may be small amounts of other particle sizes present but they will not effect the process of the invention.

The aggregate particles may be introduced in the respective zones as previously described in any suitable manner, for example, a chute or hopper. A funnel chute 30 is conveniently used at the stationary input end wall with coarse particles 25 introduced via conveyor 46. The particles will pass through an opening in the end wall 47 so as to drop through the hot flame and combustion gases of burner 12. For introducing smaller particles in cooler drum zones a scoop means secured to the drum exterior and cooperating with a trough into which composition is placed is illustrated in FIG. 1. As shown, a trough 36 is stationarily positioned around the rotating cylindrical drum 10. A plurality of spaced ports 20 are located around the drum surface which ports open into the drum interior and communicate exteriorly thereof. A scoop 31 is secured to the drum exterior overlying each port 20, the scoops having a cavity which communicates with the port and an edge providing a surface for engaging aggregate as the drum rotates. Trough 36 extends around the drum covering the scoops and forms a cavity in which the scoops are disposed and pass as the drum rotates. A chute 24 communicates with trough 36 so that aggregate particles introduced through the chute and into the trough are then picked up by the scoops and fall gravitationally through ports 20 into the drum interior. The size and shape of the trough should be such as to allow scoops to pass without resistance therethrough and to pick up the aggregate introduced into the trough cavity. The trough sides will preferably have edges which follow the general shape of the drum exterior around which they extend but which side edges are spaced at least slightly from the drum surface to avoid contact since the drum rotates while the trough is maintained in a stationary position. Means for introducing aggregate into the trough, for example, via chute 24, is not especially critical and any convenient means may be used. For example, a conveyor system 22 as shown may bring aggregate up to chute 24 and which then passes into the hopper and trough.

The size and shape of the scoops and trough are not particularly critical but are preferably such that the outer edge along the scoops are of the same shape but slightly smaller than the interior wall of the trough. The scoops are also preferably sloped so that aggregate will fall easily along the scoop interior and into the ports gravitationally. More specific details of the scoops, ports and troughs used for the cooler zones may be found in applicant's co-pending application Ser. No. 601,177, filed Aug. 1, 1975, which description is incorporated herein by reference. Any means may be used for introducing the particles in the different zones, even including one or more conveyors extending into the drum from the output end, for example, through output end cover 45. Thus, the means are not critical and those shown being for the purpose of illustration.

As previously mentioned, the apparatus may incorporate one or more pipes 14 having one or more openings 15 or similar means for directing asphalt into the drum. The asphalt is preferably added hot so that it can readily be delivered through such a pipe where it is sprayed on the aggregate particles in the drum to achieve asphalt-aggregate composition. The asphalt is preferably added to the heated aggregate toward the forward, output apparatus end away from burner 12 to avoid possible burning or degradation of the asphalt. However asphalt should be introduced far enough into the drum to allow sufficient mixing with the aggregate gradually being drawn to the output end as it cascades in the rotating, tilted drum. This distance as well as the asphalt quantities will be readily determined by skilled artisans and will be dependent on the rate at which composition is drawn from the chamber. Preferably the pipe and asphalt delivery orifice 15 will extend into the drum so as to discharge the liquid asphalt near the zone at which the smallest aggregate particles are introduced and as shown in the drawing. The small particles will dry in a relatively short drum length and thereafter asphalt is preferably added as far into the drum as practical to give adequate mixing prior to composition recovery at the output end. The pipe 14 preferably is extendable to different lengths so as to provide flexibility in discharging liquid asphalt at different selected locations as desired.

Although the apparatus has been described primarily for producing asphalt-aggregate composition within the drum, it may be used simply for drying aggregate which is thereafter mixed with asphalt in another mixer such as a pugmill. This flexibility of the apparatus as well as other modifications to the apparatus as well as advantages thereof within the purview of the invention will be evident to those skilled in the art.

I claim:

1. A process for producing asphalt-aggregate compositions comprising:
    (a) separating non-asphalt containing aggregate into coarse particles and fine particles;
    (b) introducing said coarse particles in a hot zone of a rotatable drum and gradually heating and advancing said particles toward an output drum end;
    (c) introducing said fine particles in said drum downstream from said hot zone in a cooler temperature zone;
    (d) gradually mixing and heating said coarse and fine particles; and
    (e) adding and mixing asphalt with said particles downstream from said hot zone to produce said asphalt-aggregate composition.

2. In a process for producing asphalt-aggregate composition by heating and mixing non-asphalt containing aggregate particles in a rotating drum into which hot gases of combustion are directed for said heating while gradually drawing said particles from an input drum end to an output end, and mixing asphalt with said particles to produce said composition, the improvement comprising separating said aggregate particles into a plurality of different particle sizes ranging from coarse to fine, introducing coarse particles at said drum input end, said coarse aggregate particles being exposed to said gases in a hot temperature zone, and introducing smaller sized aggregate particles in said drum in one or more cooler temperature zones.

3. The process of claim 2 wherein the temperature in said hot zone is at least about 1000° F.

4. The process of claim 2 wherein the temperature in said cooler zones is below about 800° F.

5. The process of claim 3 wherein the temperature in said cooler zone is below about 800° F.

6. The process of claim 2 wherein said coarse particle size will be retained by a sieve having a mesh of between 4 and 10 U.S. series.

7. The process of claim 2 wherein said coarse particle size will be retained by a No. 8 U.S. series mesh and larger, and said fine sizes are about No. 10 U.S. series mesh and smaller.

8. The precess of claim 2 wherein said particles are separated into three size ranges comprising coarse particles retained by a No. 4 mesh sieve U.S. series, intermediate particles passing a No. 4 and retained by a No. 10 and fine particles passing greater than a No. 10.

9. The process of claim 2 wherein said asphalt is added immediately adjacent said cooler temperature zone.

10. A process for drying and heating non-asphalt containing aggregate comprising:
    (a) separating said aggregate into coarse particles and fine particles;
    (b) introducing said coarse particles in a hot zone of a rotatable drum and gradually advancing said particles toward an output drum end;
    (c) introducing said fine particles in said drum downstream from said hot zone in a cooler temperature zone; and
    (d) gradually mixing and heating said coarse and fine particles.

* * * * *